(12) United States Patent
Li et al.

(10) Patent No.: US 11,965,305 B1
(45) Date of Patent: Apr. 23, 2024

(54) ELECTRONIC WELL LID BASED ON ELECTRIC CONTROL TRAVEL SWITCH CONTROL

(71) Applicant: Jinan Yinghua Automation Technology Co., Ltd, Jinan (CN)

(72) Inventors: Yanchao Li, Jinan (CN); Yi Yan, Jinan (CN); Guoyong Lin, Jinan (CN); Zhi Zhang, Jinan (CN); Yunbo Li, Jinan (CN)

(73) Assignee: JINAN YINGHUA AUTOMATION TECHNOLOGY CO., LTD, Jinan (CN)

( * ) Notice: Subject to any disclaimer, the term of this patent is extended or adjusted under 35 U.S.C. 154(b) by 0 days.

(21) Appl. No.: 18/358,141

(22) Filed: Jul. 25, 2023

(30) Foreign Application Priority Data

Nov. 10, 2022 (CN) .......................... 202211405223.7

(51) Int. Cl.
  *E02D 29/14* (2006.01)
  *B01D 29/13* (2006.01)
  *E03F 5/04* (2006.01)

(52) U.S. Cl.
  CPC ......... *E02D 29/1418* (2013.01); *B01D 29/13* (2013.01); *E03F 5/0404* (2013.01)

(58) Field of Classification Search
  CPC .... E02D 29/1418; B01D 29/13; E03F 5/0404
  USPC .............. 210/170.03, 170.4, 170.05, 170.07, 210/170.08, 85, 86, 91, 103, 104, 106, 210/107, 112, 119, 121, 134, 141, 143, 210/146, 248, 282, 435, 455, 532.1; 52/19, 20; 404/25; 137/371; 220/810
  See application file for complete search history.

(56) References Cited

U.S. PATENT DOCUMENTS 7,658,570 B2 * 2/2010 Hill .................... E02D 29/1418
                                                    220/232
9,004,810 B2 * 4/2015 Reynolds ............ E02D 29/1418
                                                    49/21

FOREIGN PATENT DOCUMENTS

| CN | 110258760 A | 9/2019 |
| CN | 211621712 U | 10/2020 |
| CN | 113404147 A | 9/2021 |
| CN | 113605450 A | 11/2021 |
| CN | 217521642 U | 9/2022 |
| WO | WO-2022/077763 A1 | 4/2022 |

* cited by examiner

*Primary Examiner* — Madeline Gonzalez
(74) *Attorney, Agent, or Firm* — MUNCY, GEISSLER, OLDS & LOWE, P.C.

(57) ABSTRACT

An electronic well lid based on electric control travel switch control relates to the technical field of electronic well lids. The electronic well lid based on electric control travel switch control includes a well seat in splined connection with a sliding ring. The sliding ring is provided with a well lid lifting mechanism. A garbage collection mechanism is arranged on the well seat. An arc-shaped groove is formed in the sliding ring. An anti-deviation mechanism is arranged in the arc-shaped groove of the sliding ring. Square grooves are communicated with square holes by way of arrangement of the well lid lifting mechanism and cooperation of first fixing rings and the square grooves. Thus, a drainage speed of the device is increased, pedestrians may continue to pass safely on the well lid in a drainage process of the device, and the protection effect for pedestrians in the drainage process is improved.

4 Claims, 6 Drawing Sheets

ELECTRONIC WELL LID BASED ON ELECTRIC CONTROL TRAVEL SWITCH CONTROL

TECHNICAL FIELD

The present disclosure relates to the technical field of electronic well lids, and particularly relates to an electronic well lid based on electric control travel switch control.

BACKGROUND ART

Well mouths of most natural gas wells, drainage wells and cable wells are sealed by well lids. After the well mouths are sealed by the well lids, the well lids not only protect electrical components such as cables inside the wells, but also prevent pedestrians from falling into the wells. Nowadays, various well lids are distributed in every corner of cities. Due to the need to ensure timely drainage without waterlogging in cities, the drainage wells in the cities are crisscrossed, which also leads to a large number of well lids for the drainage wells.

In the case of waterlogging in cities, in order to quickly drain accumulated water, a worker usually opens well lids for drainage. This method has a very effective drainage effect. However, after the well lids are opened, it will not only affect the normal passage of pedestrians or vehicles, but also cause people to fall into wells if warning signs are not obvious, resulting in life risk. When waterlogging occurs, the pressure of water in the wells is too high, the impact of water on the well lids will cause the well lids to deviate or open, and the deviated or opened well lids may cause pedestrians to fall into the well, threatening the safety of pedestrians.

SUMMARY OF THE DISCLOSURE

The present disclosure provides an electronic well lid based on electric control travel switch control with an anti-deviation function for solving problems in the prior art.

The technical solution provided by the present disclosure is as follows: an electronic well lid based on electric control travel switch control includes a well seat; a plurality of square grooves are formed in an inner side surface of the well seat; the well seat is in splined connection with a sliding ring; one side of an inner ring surface of the sliding ring is hinged with a well lid through a stationary shaft; a travel switch is connected to the other side of the inner ring surface of the sliding ring and is configured to monitor the opening and closing of the well lid; a monitoring controller is arranged on the well lid, has the functions of liquid level monitoring and inclination monitoring, and is respectively connected to a remote control terminal and a handheld control terminal through a wireless connection; the travel switch is electrically connected to the monitoring controller; the sliding ring is provided with a well lid lifting mechanism and is electrically connected to the monitoring controller; a garbage collection mechanism is arranged on the well seat, and is configured to clean and collect garbage entering the well seat; an arc-shaped groove is formed in the sliding ring; a well lid anti-deviation mechanism is arranged in the arc-shaped groove of the sliding ring and is electrically connected to the monitoring controller.

Further, the well lid lifting mechanism includes a fixing sleeve. The fixing sleeve is fixedly connected to the sliding ring. The upper part of the fixing sleeve is arranged in a shape of an inverted circular truncated cone. Threads are arranged on an outer ring surface of the fixing sleeve. A rotating plate is rotatably connected to the well seat and is in threaded connection with the fixing sleeve. A first fixing ring is fixedly connected to the upper part of the fixing sleeve. The first fixing ring and the well seat are in sealed sliding. A plurality of square holes are formed in the fixing sleeve at equal intervals. A toothed ring is fixedly connected to the rotating plate. A first deceleration motor is fixedly connected to the well seat through a mounting seat and is electrically connected to the monitoring controller. A first gear is fixedly connected to an output shaft of the first deceleration motor and is engaged with the toothed ring.

Further, the garbage collection mechanism includes a second fixing ring which is fixedly connected to the well seat and is located at a lower side of a rotating plate. A plurality of first fixing plates are fixedly connected to the second fixing ring at equal intervals in a circumferential direction. A third fixing ring is arranged at the inner ends of the plurality of first fixing plates. The height position of the third fixing ring is lower than that of the first fixing plate. The third fixing ring is provided with a plurality of fixing columns at equal intervals. The fixing columns are sleeved with a circular ring. A net bag is arranged on the circular ring. The fixing sleeve is provided with a cleaning component configured to dredge the spaced first fixing plates.

Further, the circular ring is made of a strong magnetic material, and a diameter of the circular ring is the same as that of a third fixing ring, which is convenient for the installation of the circular ring.

Further, the cleaning component includes a rotating sleeve which is rotatably connected to the fixing sleeve. A plurality of inclined plates are fixedly connected to the rotating sleeve at equal intervals in a circumferential direction. A plurality of cleaning plates are fixedly connected to a lower side surface of the rotating sleeve at equal intervals in a circumferential direction and are respectively matched with each of the first fixing plates.

Further, the cleaning plates are made of elastic friction-resistant materials, and the plurality of cleaning plates are configured to clean the first fixing plates.

Further, the well lid anti-deviation mechanism includes a plurality of limiting plates. The plurality of limiting plates are respectively and fixedly connected to a lower side surface of the well lid. An arc-shaped plate is slidably connected inside the arc-shaped groove of the sliding ring. A plurality of second fixing plates are fixedly connected to an inner ring surface of the arc-shaped plate and are respectively matched with the adjacent arc-shaped plate for limiting. An arc-shaped rack is fixedly connected to one side of the arc-shaped plate. A second deceleration motor is fixedly connected to the sliding ring through the mounting seat and is electrically connected to the monitoring controller. A second gear is fixedly connected to an output shaft of the second deceleration motor and is engaged with the arc-shaped rack.

Further, a well lid locking mechanism is further included. The well lid locking mechanism is arranged on the sliding ring and the well lid, is configured to fix and limit the well lid, and includes a first fixing block. The first fixing block is fixedly connected to a lower side surface of the well lid. A connecting rod is slidably connected to the first fixing block. Damping is arranged between the first fixing block and the connecting rod. A handle is arranged at one end of the connecting rod. A mounting plate is fixedly connected to the connecting rod. The connecting rod is sheathed with a spring. Both ends of the spring are respectively and fixedly connected to the first fixing block and the mounting plate of the connecting rod. A connecting frame is fixedly connected to the other end of the connecting rod. A ratchet wheel is fixedly connected to a stationary shaft of the sliding ring. A pawl is rotatably connected to the sliding ring through a rotating shaft and is matched with the ratchet wheel. The left and right parts of a rotating shaft of the pawl are respectively sheathed with torsion springs. Two ends of each of the two torsion springs are respectively and fixedly connected to the pawl and the sliding ring. A second fixing block is fixedly connected to the pawl and is provided with a long through hole. The connecting frame is in slip connection with the long through hole of the second fixing block.

Further, a fixing auxiliary mechanism is further included. The fixing auxiliary mechanism is arranged on the well lid, is configured to fix the well lid, makes the well lid be uniformly stressed in a case that water in a well impacts upwards, and includes a plurality of sliding strips. The plurality of sliding strips are slidably connected to a lower side surface of the well lid at equal intervals in a circumferential direction. Connecting plates are hinged at the inner ends of the plurality of sliding strips. Counterweight rings are hinged on the plurality of connecting plates. A plurality of square limiting holes are formed in an inner ring surface of the sliding ring at equal intervals in a circumferential direction and located at the lower side of the arc-shaped groove of the sliding ring. The outer ends of the plurality of sliding strips are respectively matched with the adjacent square limiting holes for limiting.

Further, the lower part of the counterweight ring is provided with a counterweight, the material density of the counterweight ring is less than that of water, and the counterweight ring is configured to float on the water surface.

In conclusion, due to the adoption of the above technical solution, the present disclosure has the beneficial effects that: the square grooves are communicated with the square holes by arranging the well lid lifting mechanism and using the cooperation of the first fixing ring and the square grooves, so that a drainage speed of the device is increased, and the influence of accumulated water in a city on the normal passage of pedestrians due to a slow drainage speed is avoided; compared with an existing drainage method of lifting the well lid, the device enables pedestrians to continue to pass safely on the well lid in a drainage process thereof, and improves a protection effect for the pedestrians in the drainage process; the well lid is fixed by arranging the well lid anti-deviation mechanism and using the cooperation and limitation of the two limiting plates and the adjacent second fixing plate to avoid the accident that the well lid is opened under the impact of water and the pedestrians fall into the well, and improve the safety protection for the pedestrians, and at the same time, the cooperation and limitation of the two limiting plates and the adjacent second fixing plate also play a role in preventing the well lid from being stolen; by arranging the garbage collection mechanism, accumulated water is filtered by the net bag of the circular ring, so that large-volume garbage in the accumulated water is filtered and collected, the practicability of the device is improved, and the well is prevented from being blocked by the garbage for a long time to cause the poor drainage in the well; the interval between the first fixing plates is configured to ensure the filtering effect on the garbage in the accumulated water at the same time, so that the cleaning effect of the device on the garbage in the accumulated water is improved, and the blockage in a process of filtering the garbage in the accumulated water is avoided; the net bag of the circular ring has a high bearing capacity, prevents the pedestrians from falling into the well and realizes the safety protection effect for the pedestrians; by arranging the well lid locking mechanism and using the cooperation of the pawl and the ratchet wheel, the well lid is fixed, and is prevented from quickly resetting in a case that the well lid is not stably supported, if the worker climbs up along the well, the well lid quickly resetting will hurt the head and hands of the worker, and the safety of the device is improved; the well lid is fixed again by arranging the fixing auxiliary mechanism and using the sliding strips, so that the well lid anti-deviation mechanism is prevented from being damaged by pressure impact for a long time and losing the limiting effect on the well lid, and the safety of the device is improved; and at the same time, after the sliding strips are matched with the square limiting holes, the stress area between the well lid and the sliding ring may be increased, and the local stress damage of the well lid may be avoided.

Figure 1:
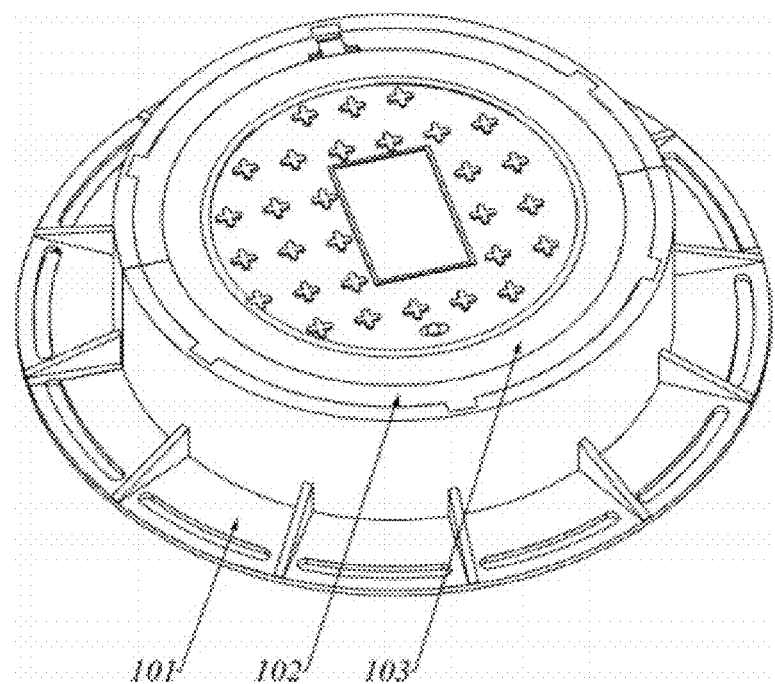
FIG. 1 is a schematic three-dimensional structural diagram of the present disclosure.
Figure 2:
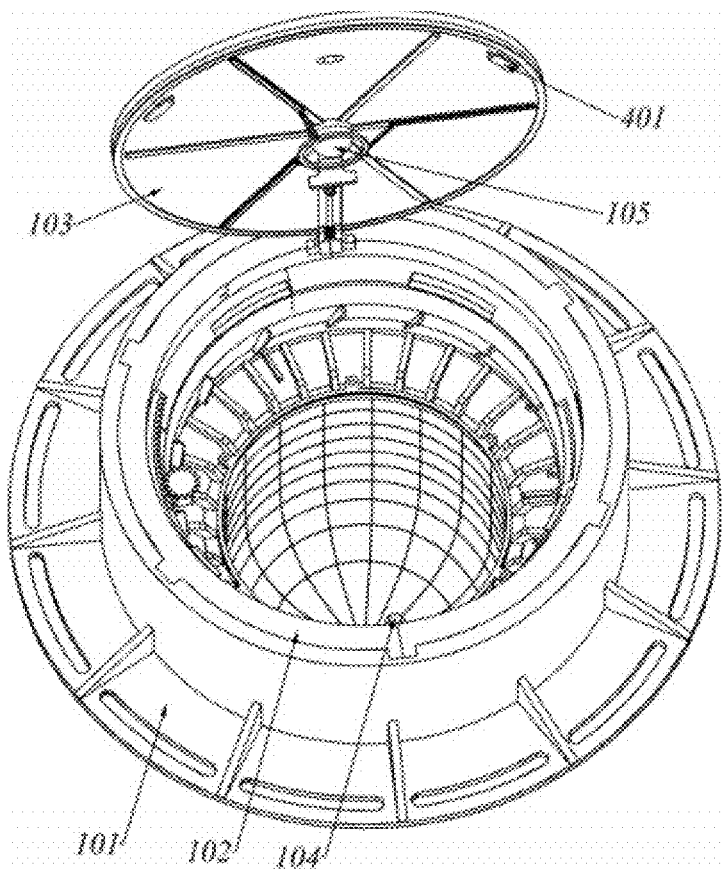
FIG. 2 is a schematic three-dimensional structural diagram after the present disclosure is opened.

Numerals in drawings: 101-well seat, 1011-square groove, 102-sliding ring, 103-well lid, 104-travel switch, 105-monitoring controller, 201-fixing sleeve, 202-rotating plate, 203-first fixing ring, 204-square hole, 205-toothed ring, 206-first deceleration motor, 207-first gear, 301-second fixing ring, 302-first fixing plate, 303-third fixing ring, 304-fixing column, 305-circular ring, 306-rotating sleeve, 307-inclined plate, 308-cleaning plate, 401-limiting plate, 402-arc-shaped plate, 403-second fixing plate, 404-arc-shaped rack, 405-second deceleration motor, 406-second gear, 501-first fixing block, 502-connecting rod, 503-spring, 504-connecting frame, 505-ratchet wheel, 506-pawl, 507-torsion spring, 508-second fixing block, 601-sliding strip, 602-connecting plate, 603-counterweight ring, and 604-square limiting hole.

DETAILED DESCRIPTION OF THE DISCLOSURE

In the description of the present disclosure, it should be noted that orientations or positional relationships indicated in terms only refer to orientations or positional relationships shown in the accompanying drawings, not the specific orientation of each element, and cannot be understood as a limitation of the present disclosure. The connection relationships in the present disclosure are all expressed in a broad sense, and cannot be understood as a limitation of the present disclosure. Those skilled in the art will further understand the connection relationships in the broad sense according to specific situations with reference to the accompanying drawings.

EMBODIMENT 1

As shown in FIG. 1 to FIG. 7, an electronic well lid based on electric control travel switch control includes a well seat 101. Three square grooves 1011 are formed in an inner side surface of the well seat 101. A sliding ring 102 is in splined connection with the well seat 101. A well lid 103 is in hinged connection with the rear side of an inner ring surface of the sliding ring 102 through a stationary shaft. A travel switch 104 is in bolted connection with the front side of the inner ring surface of the sliding ring 102. The travel switch is made of a reed switch, which has a magnet and inert gas therein. The outside of the travel switch is sleeved with a pipe made of corrosion-resistant POM. An elastic member in the travel switch is made of 316 stainless steel to avoid poor contact of the travel switch caused by long-term contact with water. The travel switch 104 is configured to monitor the opening and closing of the well lid 103. The well lid 103 is equipped with a monitoring controller 105. The monitoring controller 105 has the functions of liquid level monitoring and inclination monitoring, and is respectively connected to a remote control terminal and a handheld control terminal through a wireless connection. When the liquid level in the well is too high and the well seat 101 inclines, the monitoring controller 105 may monitor such changes and transmit a signal to the remote control terminal through the wireless connection. The travel switch 104 is electrically connected to the monitoring controller 105. The sliding ring 102 is provided with a well lid lifting mechanism. The well lid lifting mechanism is electrically connected to the monitoring controller 105. In case of urban waterlogging, the monitoring controller 105 controls the well lid lifting mechanism to drive the well lid 103 to move downwards along the well seat 101, and the well lid 103 moves downward for a short distance. The well lid lifting mechanism is communicated with the square grooves 1011 to drain water, and the accumulated water is discharged into the well through the square grooves 1011 and the well lid lifting mechanism, so that the normal passage of pedestrians is not affected in a process of draining water accumulated on the road. The well seat 101 is provided with a garbage collection mechanism. The garbage collection mechanism cleans and collects the garbage entering the well seat 101, and filters the accumulated water discharged into the well to prevent all the garbage in the accumulated water from entering the well to cause the accumulation and blockage of garbage in the well and reduce the drainage efficiency of the whole urban drainage system. An arc-shaped groove is formed in the sliding ring 102. The well lid anti-deviation mechanism is arranged in the arc-shaped groove of the sliding ring 102, is electrically connected to the monitoring controller 105 and is matched with the well lid 103. In the case of urban waterlogging, the well lid 103 is limited and fixed by using the well lid anti-deviation mechanism, so that the well lid 103 is always connected to the well seat 101 through the sliding ring 102.

In a process of using the device, when a worker needs to work in the well, the worker transmits a signal to the monitoring controller 105 through the handheld control terminal, the monitoring controller 105 starts the well lid anti-deviation mechanism, and the well lid anti-deviation mechanism and the well lid 103 are out of limit fit. After the worker lifts the well lid 103, the well lid 103 rotates around the stationary shaft of the well seat 101. When the weld lid 103 is out of contact with the travel switch 104, contacts of the travel switch 104 are triggered at the same time. The travel switch 104 solves the problems that the touching and rebounding of the existing travel switch are affected, and the existing travel switch is in poor contact due to contact with water in the event of heavy rain. The service life of the travel switch 104 is prolonged. The travel switch 104 transmits the signal to the monitoring controller 105. The monitoring controller 105 transmits the signal to the remote control terminal through the wireless connection. The remote control terminal may monitor the opening situation and frequency of the well lid 103 in real time and count the data. The worker takes out the garbage collection mechanism, so that the worker enters the well for operation through the well seat 101. When the operation is finished, the worker resets the garbage collection mechanism, and then resets the well lid 103. The worker transmits a signal to the well lid anti-deviation mechanism again through the control terminal. The well lid anti-deviation mechanism resets to limit the well lid 103 again. The well lid anti-deviation mechanism is configured to limit the well lid 103, so as to prevent people from stealing the well lid 103 to cause danger to pedestrians on the road. If the people violently disassemble the well lid 103, the monitoring controller 105 monitors that the well lid 103 tilts and vibrates, the monitoring controller 105 transmits the signal to the remote control terminal through the wireless connection, the worker protects the well lid 103 through the data of the remote control terminal, and the frequency of the well lid 103 being stolen is reduced. At the same time, when the well seat 101 tilts, the monitoring controller 105 monitors that the whole device tilts, and the monitoring controller 105 transmits a signal to the remote control terminal, so that the worker may replace the tilted well seat 101 according to the signal received by the remote control terminal, and the working efficiency of the worker maintaining the well lid 103 is improved. In the case of urban waterlogging, there is accumulated water in the position of the device, and the worker transmits a signal to the device through the remote control terminal. After receiving the signal from the remote control terminal, the monitoring controller 105 of the device starts the well lid lifting mechanism, the well lid lifting mechanism drives the sliding ring 102 and the well lid 103 thereon to move downwards, and is communicated with the square grooves 1011, so that the a drainage speed of accumulated water is improved, and at the same time, it is realized that pedestrians may safely pass on the device in the drainage process of the device. The accumulated water entering the device passes through the garbage collection mechanism. The garbage collection mechanism filters the accumulated water and filters and collects the garbage in the accumulated water, so as to prevent the garbage in the accumulated water from entering the well to cause blockage and the situation that the accumulated water cannot be discharged in the well in time to gather. After all the accumulated water is discharged, the worker transmits a signal to the device through the remote control terminal, and the monitoring controller 105 starts the well lid lifting mechanism, the well lid lifting mechanism drives the sliding ring 102 and the well lid 103 to reset.

When waterlogging occurs in the city, the water in the well will impact upward along the well due to the pressure increase. After the water impacting upwards impacts the well seat 101, the well lid 103 is limited by using the well lid anti-deviation mechanism to ensure that the well seat 101, the sliding ring 102 and the well lid 103 are always connected, thereby avoiding the accident that pedestrians fall into the well after the well lid 103 is opened due to impacting; the garbage collection mechanism protects pedestrians for the second time; and when pedestrians fall into the well, the garbage collection mechanism supports the pedestrians entering the well, and thus, the safety and practicability of the device is improved.

EMBODIMENT 2

Figure 3:
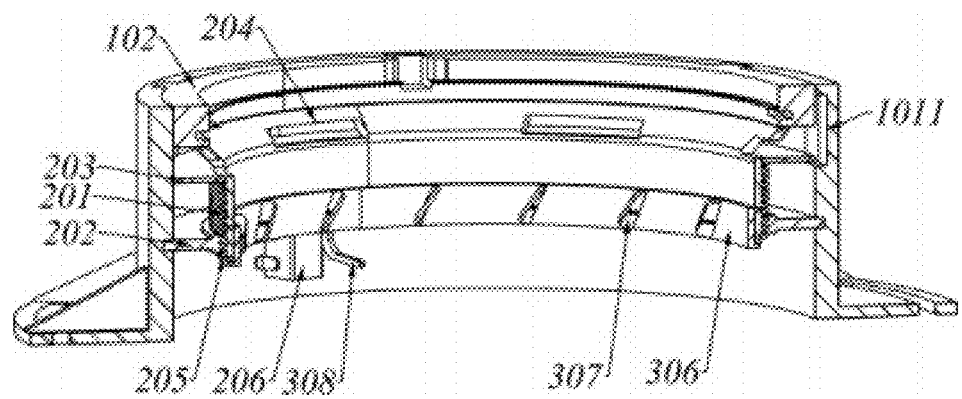
FIG. 3 is a schematic partial sectional three-dimensional structural diagram of the present disclosure.
Figure 4:
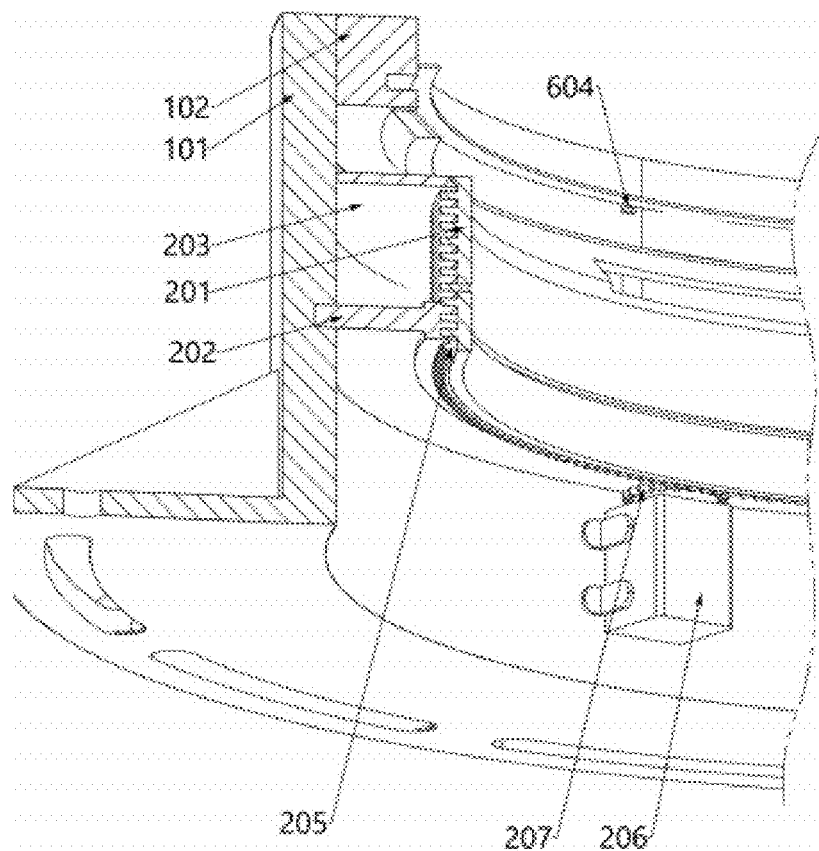
FIG. 4 is a schematic three-dimensional structural bottom view of a well lid lifting mechanism of the present disclosure.

On the basis of embodiment 1, as shown in FIG. 3 and FIG. 4, the well lid lifting mechanism includes a fixing sleeve 201 which is welded on a sliding ring 102. The upper part of the fixing sleeve 201 is arranged in a shape of an inverted circular truncated cone. Threads are arranged on an outer ring surface of the fixing sleeve 201. A rotating plate 202 is rotatably connected to the lower part of the inner ring surface of a well seat 101 and is in threaded connection with the fixing sleeve 201. When the rotating plate 202 rotates, the fixing sleeve 201 and other parts are driven to move downwards through the threads. When the sliding ring 102 moves downwards to the middle of the square grooves 1011, accumulated water will inflow from the square grooves 1011. A first fixing ring 203 is welded on the upper part of the outer side of the fixing sleeve 201. The first fixing ring 203 and the inner ring surface of the well seat 101 are in sealed sling. A plurality of square holes 204 are formed in the fixing sleeve 201 at equal intervals. Accumulated water inflowing from the square grooves 1011 flows into the well through the square holes 204. In the drainage process of the device, pedestrians may continue to pass safely on the well lid 103. A toothed ring 205 is welded on the lower side surface of the rotating plate 202. A first deceleration motor 206 is in bolted connection with the inner ring surface of the well seat 101 through a mounting seat. The first deceleration motor 206 has a self-locking function and is waterproof, and therefore, the first deceleration motor 206 is prevented from being damaged by water during operation. The first deceleration motor 206 is electrically connected to the monitoring controller 105. A first gear 207 is in key connection with an output shaft of the first deceleration motor 206 and is engaged with a toothed ring 205.

Figure 5:
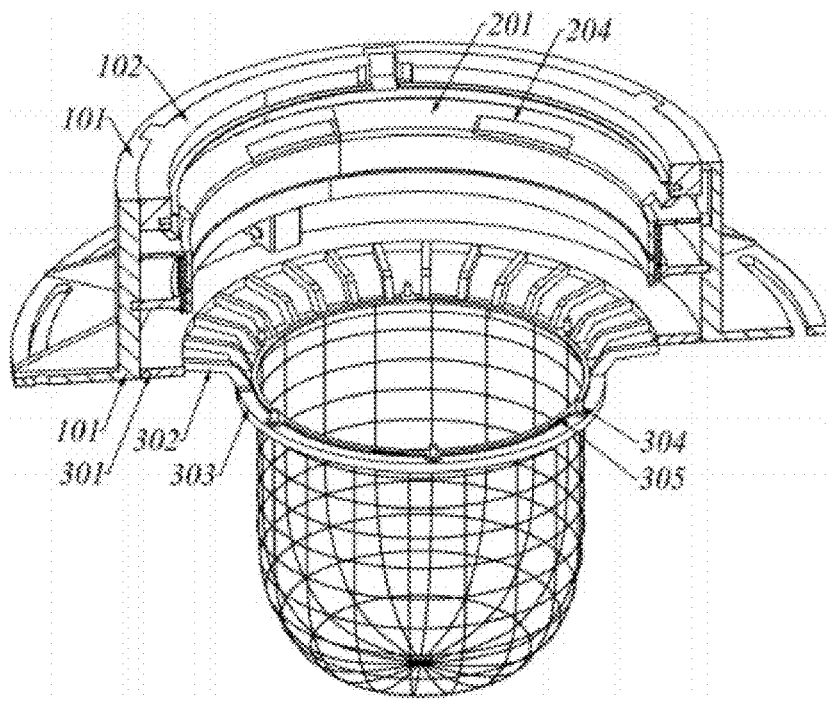
FIG. 5 is a schematic three-dimensional structural diagram of a garbage collection mechanism of the present disclosure.
Figure 6:
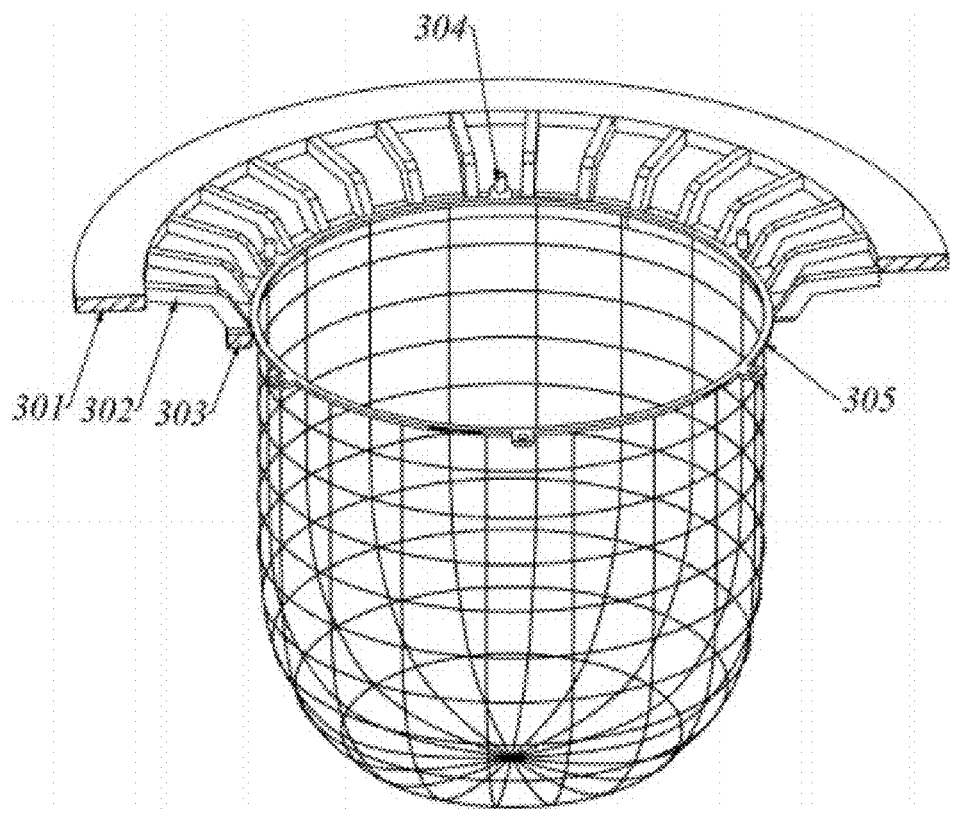
FIG. 6 is a schematic sectional three-dimensional structural diagram of a garbage collection mechanism of the present disclosure.

As shown in FIG. 5 and FIG. 6, the garbage collection mechanism includes a second fixing ring 301 which is welded on the well seat 101 and is located at a lower side of the rotating plate 202. A plurality of first fixing plates 302 are welded on the second fixing ring 301 at equal intervals in a circumferential direction. A third fixing ring 303 is welded at the inner ends of the plurality of first fixing plates 302 and is made of iron. The height position of the third fixing ring 303 is lower than that of the first fixing plate 302. Five fixing columns 304 are welded on the third fixing ring 303 at equal intervals and are sleeved with a circular ring 305. The circular ring 305 is sleeved with a net bag. The net bag of the circular ring 305 filters and collects garbage in accumulated water to avoid the garbage entering the well and causing garbage accumulation in the well. The circular ring 305 is made of a hard metal ring and has a strong magnetic force. The net bag of the circular ring 305 has a large bearing capacity. When pedestrians fall into the well, the net bag of the circular ring 305 plays a supporting role for the pedestrians and avoids the pedestrians falling into the well and being injured. A diameter of the circular ring 305 is the same as that of the third fixing ring 303, which is convenient for the installation of the circular ring 305. The circular ring 305 is located on the upper side of the third fixing ring 303 and is adsorbed by magnetic attraction force. During installation, the circular ring 305 only needs to be sleeved on the fixing columns 304, and the operation is simple and convenient. The fixing sleeve 201 is provided with a cleaning component configured to dredge the spaced first fixing plates 302.

As shown in FIG. 3, the cleaning component includes a rotating sleeve 306 which is rotatably connected to an inner side surface of the fixing sleeve 201. A plurality of inclined plates 307 are welded on the rotating sleeve 306 at equal intervals in a circumferential direction. Three cleaning plates 308 are fixedly connected to a lower side surface of the rotating sleeve 306 at equal intervals in a circumferential direction. When the fixing sleeve 201 moves downwards, the three cleaning plates 308 move downwards at the same time and contact with the first fixing plates 302. The cleaning plates 308 are made of elastic friction-resistant materials. The three cleaning plates 308 are configured to clean the first fixing plates 302. When accumulated water impacts the inclined plates 307, the rotating sleeve 306 drives the three cleaning plates 308 to rotate circumferentially to clean the garbage on the first fixing plates 302. The garbage on the first fixing plates 302 is cleaned into the net bag of the circular ring 305 to prevent the interval between adjacent first fixing plates 302 from being blocked. The three cleaning plates 308 are respectively matched with each of first fixing plates 302.

Figure 7:
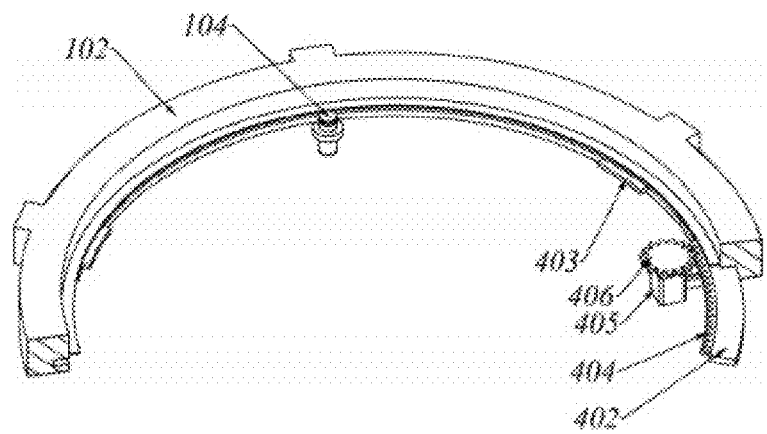
FIG. 7 is a schematic three-dimensional structural diagram of a well lid anti-deviation mechanism of the present disclosure.
Figure 8:
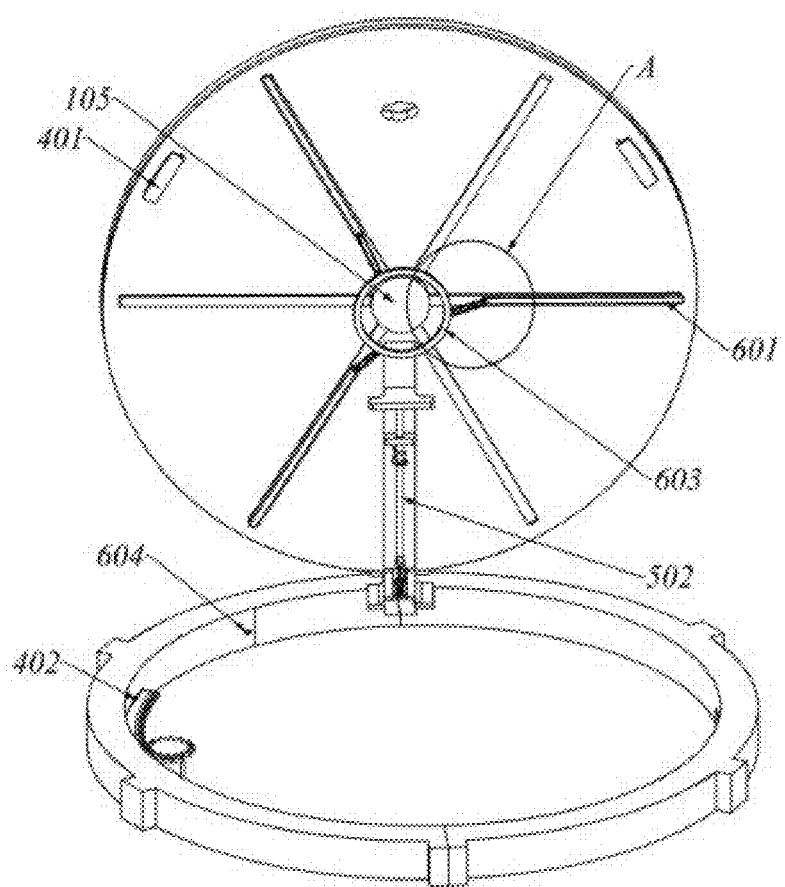
FIG. 8 is a schematic three-dimensional structural diagram of a well lid locking mechanism of the present disclosure.

As shown in FIG. 7 and FIG. 8, the well lid anti-deviation mechanism includes two limiting plates 401. The two limiting plates 401 are respectively welded on a lower side surface of the well lid 103. An arc-shaped plate 402 is slidably connected inside the arc-shaped groove of the sliding ring 102. Two second fixing plates 403 are welded on an inner ring surface of the arc-shaped plate 402, are respectively matched with the adjacent arc-shaped plate 402 for limiting, and fix and limit the well lid 103 to avoid the accident that the well lid 103 is opened under the impact of water and pedestrians fall into the well, improve the safety protection of pedestrians, and prevent the risk of theft of the well lid 103. An arc-shaped rack 404 is fixedly connected to one side of the arc-shaped plate 402. A second deceleration motor 405 is in bolted connection with the sliding ring 102 through a mounting seat. The second deceleration motor 405 has a self-locking function and is waterproof, and is prevented from being damaged by contact with water for a long time. The second deceleration motor 405 is electrically connected to the monitoring controller 105, and a second gear 406 is in key connection with an output shaft of the second deceleration motor 405 and is engaged with the arc-shaped rack 404.

When a worker needs to work in the well, the worker transmits a signal to the monitoring controller 105 through the handheld control terminal, and the monitoring controller 105 starts the second deceleration motor 405. The output shaft of the second deceleration motor 405 is driven by the second gear 406 and the arc-shaped rack 404, and drives the arc-shaped plate 402 and the two second fixing plates 403 thereon to slide along the arc-shaped groove of the sliding ring 102. The two second fixing plates 403 are respectively out of limit with the adjacent limiting plates 401. The worker lifts the well lid 103, the well lid 103 rotates around the fixing columns 304 of the sliding ring 102, and then the worker takes out the circular ring 305 and the net bag thereon, and goes down into the well for construction. After the construction is completed, the worker sleeves the circular ring 305 on the fixing columns 304. The circular ring 305 is adsorbed on the third fixing ring 303 by magnetic force attraction, and is fixed and limited by way of the fixing columns 304, which facilitates the installation of the circular ring 305 on the third fixing ring 303, thus improving the practicability of the device and avoiding the reduction of the working efficiency caused by the complicated assembly by the worker. After the worker resets the well lid 103, the worker transmits a signal to the monitoring controller 105 through the handheld control terminal, and the monitoring controller 105 starts the second deceleration motor 405, so that the arc-shaped plate 405 and the second fixing plate 403 thereon reset, and the second deceleration motor 402 is shut off and self-locking.

During urban waterlogging, after accumulated water is collected in the area of the device, the worker transmits a signal to the monitoring controller 105 through the remote control terminal. After receiving the signal, the monitoring controller 105 starts the first deceleration motor 206. The output shaft of the first deceleration motor 206 is driven by the first gear 207 and the toothed ring 205, and the rotating plate 202 rotates along the well seat 101. When the rotating plate 202 rotates, the fixing sleeve 201 is driven to move downwards through the threads. The fixing sleeve 201 drives the sliding ring 102, the well lid 103 and the first fixing ring 203 to move downwards at the same time. When the sliding ring 102 moves downwards to the middle of the square grooves 1011, the monitoring controller 105 shuts off the first deceleration motor 206, the first fixing ring 203 is in sealing fit with the well seat 101, and the accumulated water flows downwards between the rotating plate 202 and the first fixing ring 203 along the square grooves 1011, and then flows into the device from the square holes 204. The square grooves 1011 are communicated with the square holes 204 through the cooperation of the first fixing ring 203 and the square grooves 1011, so that the drainage speed of the device is increased, and the influence of the accumulated water in the city on the normal passage of pedestrians due to a slow drainage speed is avoided. Compared with an existing drainage method of lifting the well lid 103, the device enables pedestrians to continue to pass safely on the well lid 103 in the drainage process thereof, and improves a protection effect for the pedestrians in the drainage process.

The accumulated water flows downwards after passing through the square holes 204, and is filtered by the net bag of the circular ring 305, so that the garbage in the accumulated water is filtered and collected, the practicability of the device is improved, and the well is prevented from being blocked by the garbage for a long time to cause the poor drainage in the well. The height position of the third fixing ring 303 is lower than that of the second fixing ring 301. When the garbage touches the first fixing plates 302, the garbage in the accumulated water is also filtered by way of the interval between the first fixing plates 302. The filtered garbage directly slides into the net bag of the circular ring 305 along the inclined surfaces of the first fixing plates 302. The filtering effect of the net bag of the circular ring 305 on the accumulated water is reduced due to the gradual increase of the garbage in the net bag of the circular ring 305, the filtering effect on the garbage in the accumulated water is ensured at the same time by way of the interval between the first fixing plates 302, therefore, the cleaning effect of the device on the garbage in the accumulated water is improved, and blockage in a process of filtering the garbage in the accumulated water is avoided. In a downward flowing process of the accumulated water, the accumulated water continuously impacts on the inclined plates 307; and the inclined plates 307 drive the rotating sleeve 306 and the cleaning plates 308 to rotate along the circumferential direction of the fixing sleeve 201 after being impacted. When the fixing sleeve 201 moves downward, the fixing sleeve 201 also drives the rotating sleeve 306 and the cleaning plates 308 to move downward, the cleaning plates 308 contact the first fixing plates 302, the first fixing plates 302 are continuously cleaned by way of the cleaning plates 308 circumferentially rotating, the garbage on the first fixing plates 302 is cleaned into the inner parts of the net bag of the circular ring 305, and is prevented from blocking the adjacent first fixing plates 302. The filtering efficiency of the device for the accumulated water is improved. When the well lid 103 is damaged or lost, the net bag of the circular ring 305 has a relatively high bearing capacity, so that pedestrians are prevented from falling into the well, and the safety protection effect for pedestrians is realized.

When all the accumulated water is discharged, the worker transmits a signal to the device through the remote control terminal, the monitoring controller 105 restarts the first deceleration motor 206, so that the fixing sleeve 201 drives the well lid 103 and parts thereon to reset, and the monitoring controller 105 shuts off the first deceleration motor 206. After the drainage of the device is completed, the worker collects and cleans the garbage in the net bag of the circular ring 305, which is convenient for the next use of the device.

When the pressure of water in the well is too high, the water impacts the well lid 103 upwards along the well, and the well lid 103 is fixed and limited by way of the cooperation and limitation of the two limiting plates 401 and the adjacent second fixing plate 403, so as to avoid the accident that the well lid 103 is opened under the impact of water and pedestrians fall into the well, and improve the safety protection for pedestrians. At the same time, the cooperation and limitation of the two limiting plates 401 and the adjacent second fixing plate 403 also play a role in preventing the well lid 103 from being stolen.

EMBODIMENT 3

On the basis of embodiment 2, in the drainage process of the device, if the device is in an environment with many fallen leaves in autumn, a large number of leaves will be attached to the top of the well lid 103, and a large number of accumulated leaves may block the square grooves 1011. The monitoring controller 105 controls the first deceleration motor 206 to intermittently reciprocate, so that the fixing sleeve 201 drives the sliding ring 102 and the well lid 103 to reciprocate up and down. When the well lid 103 moves upwards, the leaves attached to the top of the well lid 103 are pushed upwards, so that the leaves are far away from the well lid 103 under the action of water flow, and then the well lid 103 moves downwards to drain water again. Although it takes a long time to drain water, it ensures that the device may continuously drain water, and therefore, the accumulated water in the city may be drained without the dredging of a worker, and the practicability of the device is improved.

EMBODIMENT 4

Figure 9:
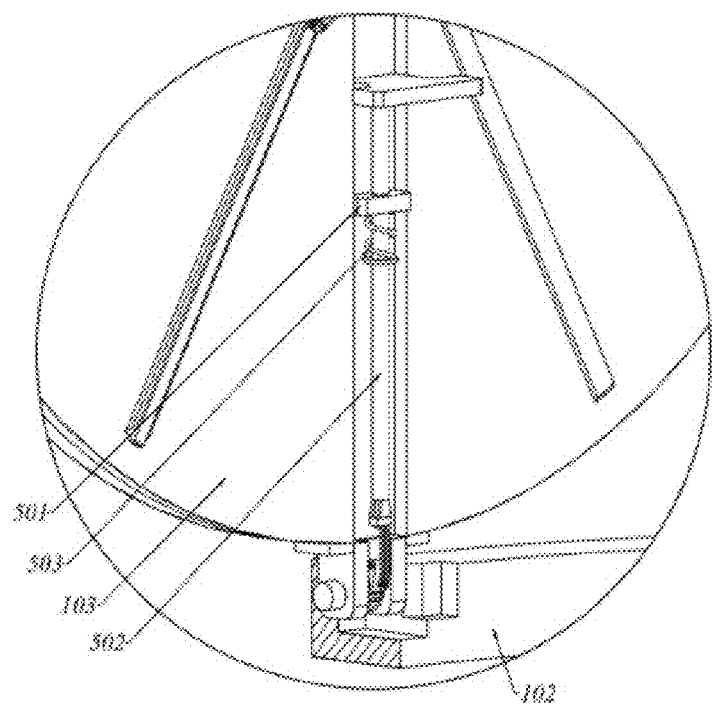
FIG. 9 is a schematic partially enlarged three-dimensional structural diagram of the well lid locking mechanism of the present disclosure.
Figure 10:
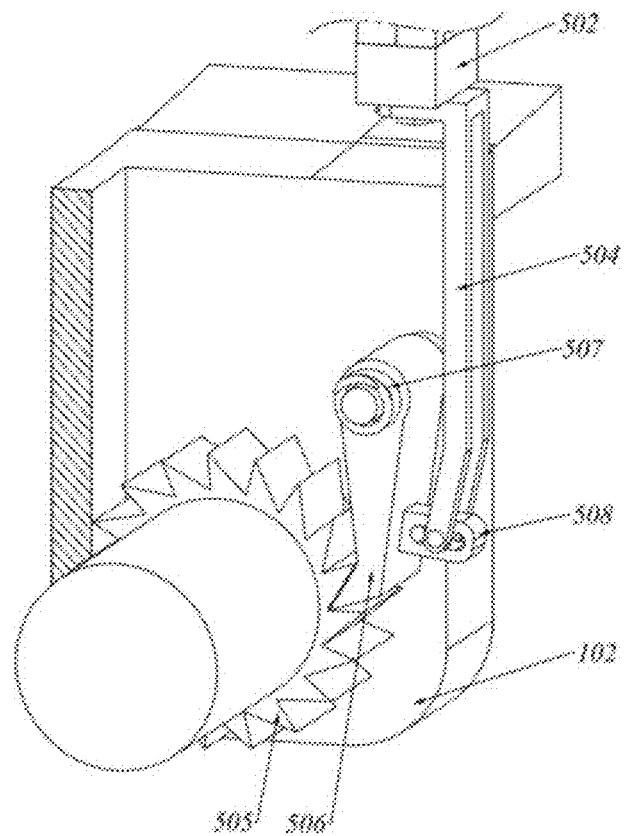
FIG. 10 is a schematic partial three-dimensional structural diagram of the well lid locking mechanism of the present disclosure.

On the basis of embodiment 3, as shown in FIG. 8 to FIG. 10, a well lid locking mechanism is further included. The well lid locking mechanism is arranged on the sliding ring 102 and the well lid 103, is configured to fix and limit the well lid 103, and includes a first fixing block 501. The first fixing block 501 is welded on a lower side surface of the well lid 103. A connecting rod 502 is in slip connection with the first fixing block 501. Damping is arranged between the first fixing block 501 and the connecting rod 502, so that a reset speed of the connecting rod 502 is reduced. A handle is in bolted connection with the front end of the connecting rod 502. A mounting plate is welded on the connecting rod 502. The connecting rod 502 is sheathed with a spring 503. Both ends of the spring 503 are respectively and fixedly connected to the first fixing block 501 and the mounting plate of the connecting rod 502. A connecting frame 504 is in bolted connection with the rear end of the connecting rod 502. A ratchet wheel 505 is in key connection with a stationary shaft of the sliding ring 102. A pawl 506 is rotatably connected to the sliding ring 102 through a rotating shaft and is matched with the ratchet wheel 505. The well lid 103 is fixed through the cooperation of the pawl 506 and the ratchet wheel 505, and is prevented from quickly resetting in a case that the well lid 103 is not stably supported. If the worker climbs up along the well, the well lid 103 quickly resetting will hurt the head and hands of the worker. The left and right parts of the rotating shaft of the pawl 506 are respectively sheathed with torsion springs 507. Two ends of each of the two torsion springs 507 are respectively and fixedly connected to the pawl 506 and the sliding ring 102. A second fixing block 508 is welded on the lower side surface of the pawl 506. A long through hole is formed in the middle of the second fixing block 508. The connecting frame 504 is in slip connection with the long through hole of the second fixing block 508.

When the well lid 103 is opened, the well lid 103 rotates around the stationary shaft of the sliding ring 102, and drives the pawl 506 and other parts to rotate around the stationary shaft of the sliding ring 102. The pawl 506 is always engaged with the ratchet wheel 505 under the elastic force of the two torsion springs 507. After the well lid 103 rotates to a designated position, the well lid 103 is fixed through the cooperation of the pawl 506 and the ratchet wheel 505, and is prevented from quickly resetting in a case that the well lid 103 is not stably supported. If the worker climbs up along the well, the well lid 103 quickly resetting will hurt the head and hands of the worker. The safety of the device is improved. When the well lid 103 needs to reset, the worker needs to pull the handle on the connecting rod 502, the spring 503 is compressed, the connecting rod 502 drives the connecting frame 504 to move, and the connecting frame 504 slides along the long through hole of the second fixing block 508, so that the pawl 506 rotates along the rotating shaft thereof, and is out of engagement with the ratchet wheel 505, and the two torsion springs 507 are tightened. When the worker releases the handle of the connecting rod 502, the connecting rod 502 and the pawl 506 reset under the elastic force of the spring 503 and the two torsion springs 507. As there is damping between the first fixing block 501 and the connecting rod 502, a resetting process of the connecting rod 502 is slow, which ensures that the pawl 506 cooperates with the ratchet wheel 505 again after the well lid 103 resets.

EMBODIMENT 5

Figure 11:
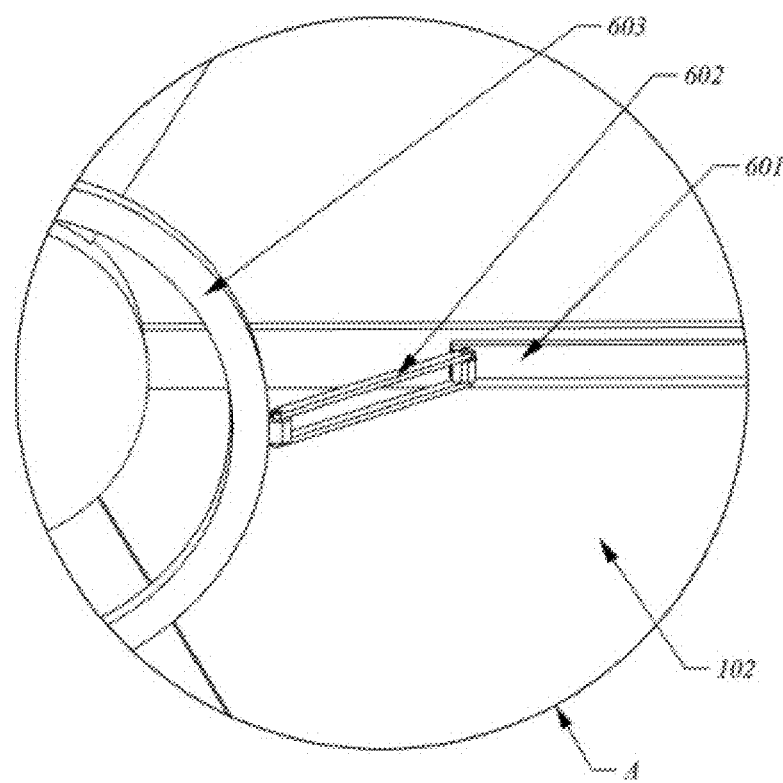
FIG. 11 is a schematic enlarged three-dimensional structural diagram of a part A of the present disclosure.

On the basis of embodiment 4, as shown in FIG. 8 and FIG. 11, a fixing auxiliary mechanism is further included. The fixing auxiliary mechanism is arranged on a lower side surface of the well lid 103, is configured to fix the well lid 103, makes the well lid 103 be uniformly stressed in a case that water in the well impacts upwards, and includes sliding strips 601. The number of the sliding strips 601 is three in total. The three sliding strips 601 are slidably connected to a lower side surface of the well lid 103 at equal intervals in a circumferential direction. Connecting plates 602 are hinged at the inner ends of the three sliding strips 601. A counterweight ring 603 is hinged on the plurality of connecting plates 602. The lower part of the counterweight ring 603 is provided with a counterweight. The material density of the counterweight ring 603 is less than that of water. The counterweight ring 603 is configured to float on the water surface. When the counterweight ring 603 is subjected to the impact force or buoyancy of water, the three sliding strips 601 all slide away from each other. Three square limiting holes 604 are formed in an inner ring surface of the sliding ring 102 at equal intervals in a circumferential direction. The three square limiting holes 604 all have inclination angles, which are convenient to cooperate with the three sliding strips 601 for limitation. The three square limiting holes 604 are all located at the lower side of the arc-shaped groove of the sliding ring 102. The three sliding strips 601 slide away from each other and are inserted into the adjacent square limiting holes 604, so as to prevent the well lid anti-deviation mechanism from being damaged by pressure impact for a long time and losing a limiting effect on the well lid 103. The outer ends of the three sliding strips 601 are respectively matched with the adjacent square limiting holes 604 for limiting, and at the same time, after the sliding strips 601 are matched with the square limiting holes 604, the stress area between the well lid 103 and the sliding ring 102 may be increased, and the local stress damage of the well lid 103 may be avoided.

When the pressure in the well is too high, water impacts the well lid 103 upwards along the well, and the well lid 103 is always connected to the sliding ring 102 and the well seat 101 under the limiting effect of the well lid anti-deviation mechanism on the well lid 103. However, due to the excessive pressure in the well, when water impacts upwards, the counterweight ring 603 moves upwards, and the three sliding strips 601 slide away from each other through the connecting plates 602 thereon, the outer ends of the three sliding strips 601 are all inserted into the adjacent square limiting holes 604, and the well lid 103 is fixed again by using the three sliding strips 601, so that the well lid anti-deviation mechanism is prevented from being damaged by pressure impact for a long time and losing the limiting effect on the well lid 103, and the safety of the device is improved. When the pressure in the well is reduced, the sliding strips 601 reset under the gravity of the counterweight ring 603, so that the well lid 103 may be opened normally. At the same time, after the sliding strips 601 are matched with the square limiting holes 604, the stress area between the well lid 103 and the sliding ring 102 may be increased, and the local stress damage of the well lid 103 may be avoided.

It should be finally noted that the foregoing descriptions are merely preferred embodiments of the present disclosure, but are not intended to limit the present disclosure. Although the present disclosure has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made and the like within the spirit and principle of the present disclosure shall fall within the protection scope of the present disclosure.

The invention claimed is:
1. An electronic well lid based on electric control travel switch control, comprising a well seat, wherein a plurality of square grooves are formed in an inner side surface of the well seat, the well seat is in splined connection with a sliding ring, one side of an inner ring surface of the sliding ring is hinged with a well lid through a stationary shaft, a travel switch is arranged on the other side of the inner ring surface of the sliding ring and is configured to monitor the opening and closing of the well lid, a monitoring controller is arranged on the well lid, has the functions of liquid level monitoring and inclination monitoring, and is respectively connected to a remote control terminal and a handheld control terminal through a wireless connection, and the travel switch is electrically connected to the monitoring controller; further comprising a well lid lifting mechanism which is arranged on the sliding ring and is electrically connected to the monitoring controller, wherein a garbage collection mechanism is arranged on the well seat, and is configured to clean and collect garbage entering the well seat, an arc-shaped groove is formed in the sliding ring, and a well lid anti-deviation mechanism is arranged in the arc-shaped groove of the sliding ring, is electrically connected to the monitoring controller and is matched with the well lid;

the well lid lifting mechanism comprises a fixing sleeve which is fixedly connected to the sliding ring, an upper part of the fixing sleeve is arranged in a shape of an inverted circular truncated cone, threads are arranged on an outer ring surface of the fixing sleeve, a rotating plate is rotatably connected to the well seat and is in threaded connection with the fixing sleeve, a first fixing ring is fixedly connected to the upper part of the fixing sleeve, the first fixing ring and the well seat are in sealed sliding, a plurality of square holes are formed in the fixing sleeve at equal intervals, a toothed ring is fixedly connected to the rotating plate, a first deceleration motor is fixedly connected to the well seat through a mounting seat and is electrically connected to the monitoring controller, and a first gear is fixedly connected to an output shaft of the first deceleration motor and is engaged with the toothed ring;

the garbage collection mechanism comprises a second fixing ring which is fixedly connected to the well seat and is located at a lower side of a rotating plate, a plurality of first fixing plates are fixedly connected to the second fixing ring at equal intervals in a circumferential direction, a third fixing ring is arranged at inner ends of the plurality of first fixing plates, a height position of the third fixing ring is lower than that of the first fixing plate, the third fixing ring is provided with a plurality of fixing columns at equal intervals, the fixing columns are sleeved with a circular ring, a net bag is arranged on the circular ring, and the fixing sleeve is provided with a cleaning component configured to dredge the first fixing plates;

the cleaning component comprises a rotating sleeve which is rotatably connected to the fixing sleeve, a plurality of inclined plates are fixedly connected to the rotating sleeve at equal intervals in a circumferential direction, and a plurality of cleaning plates are fixedly connected to a lower side surface of the rotating sleeve at equal intervals in a circumferential direction and are respectively matched with each of the first fixing plates;

the well lid anti-deviation mechanism comprises a plurality of limiting plates, the plurality of limiting plates are respectively and fixedly connected to a lower side surface of the well lid, an arc-shaped plate is slidably connected inside the arc-shaped groove of the sliding ring, a plurality of second fixing plates are fixedly connected to an inner ring surface of the arc-shaped plate and are respectively matched with the arc-shaped plate for limiting, an arc-shaped rack is fixedly connected to one side of the arc-shaped plate, a second deceleration motor is fixedly connected to the sliding ring through the mounting seat and is electrically connected to the monitoring controller, and a second gear is fixedly connected to an output shaft of the second deceleration motor and is engaged with the arc-shaped rack; and further comprising a well lid locking mechanism, wherein the well lid locking mechanism is arranged on the sliding ring and the well lid, is configured to fix and limit the well lid, and comprises a first fixing block, wherein the first fixing block is fixedly connected to a lower side surface of the well lid, a connecting rod is slidably connected to the first fixing block, damping is arranged between the first fixing block and the connecting rod, a handle is arranged at one end of the connecting rod, a mounting plate is fixedly connected to the connecting rod, the connecting rod is sheathed with a spring, and both ends of the spring are respectively and fixedly connected to the first fixing block and the mounting plate of the connecting rod, a connecting frame is fixedly connected to another end of the connecting rod, a ratchet wheel is fixedly connected to a stationary shaft of the sliding ring, a pawl is rotatably connected to the sliding ring through a rotating shaft and is matched with the ratchet wheel, left and right parts of a rotating shaft of the pawl are respectively sheathed with torsion springs, two ends of each of the torsion springs are respectively and fixedly connected to the pawl and the sliding ring, a second fixing block is fixedly connected to the pawl and is provided with a long through hole, and the connecting frame is in slip connection with the long through hole of the second fixing block; and further comprising a fixing auxiliary mechanism, wherein the fixing auxiliary mechanism is arranged on the well lid, is configured to fix the well lid, makes the well lid be uniformly stressed in a case that water in a well impacts upwards, and comprises a plurality of sliding strips, wherein the plurality of sliding strips are slidably connected to a lower side surface of the well lid at equal intervals in a circumferential direction, a plurality of connecting plates are hinged at inner ends of the plurality of sliding strips, counterweight rings are hinged on the plurality of connecting plates, a plurality of square limiting holes are formed in an inner ring surface of the sliding ring at equal intervals in a circumferential direction and located at a lower side of the arc-shaped groove of the sliding ring, and outer ends of the plurality of sliding strips are respectively matched with the square limiting holes for limiting.

2. The electronic well lid based on electric control travel switch control according to claim 1, wherein the circular ring is made of a strong magnetic material, and a diameter of the circular ring is the same as that of the third fixing ring, which is convenient for the installation of the circular ring.

3. The electronic well lid based on electric control travel switch control according to claim 1, wherein the cleaning plates are made of elastic friction-resistant materials, and the plurality of cleaning plates are configured to clean the first fixing plates.

4. The electronic well lid based on electric control travel switch control according to claim 1, wherein a lower part of each of the counterweight rings is provided with a counterweight, the material density of the counterweight ring is less than that of water, and the counterweight ring is configured to float on a water surface.

\* \* \* \* \*